(12) United States Patent
Yang et al.

(10) Patent No.: US 6,909,749 B2
(45) Date of Patent: Jun. 21, 2005

(54) HIERARCHICAL SEGMENT-BASED MOTION VECTOR ENCODING AND DECODING

(75) Inventors: Tser-Yuan Brian Yang, Livermore, CA (US); Edward R. Ratner, Sunnyvale, CA (US); Adityo Prakash, Redwood Shores, CA (US); David B. Kita, Milpitas, CA (US)

(73) Assignee: PTS Corporation, San Jose, CA (US)

( * ) Notice: Subject to any disclaimer, the term of this patent is extended or adjusted under 35 U.S.C. 154(b) by 498 days.

(21) Appl. No.: 10/196,739

(22) Filed: Jul. 15, 2002

(65) Prior Publication Data
US 2004/0008778 A1 Jan. 15, 2004

(Under 37 CFR 1.47)

(51) Int. Cl.[7] .................................................. H04N 7/12
(52) U.S. Cl. ................................................. 375/240.16
(58) Field of Search ...................... 375/240.01, 240.08, 375/240.12, 240.16, 240.21, 240.26; H04N 7/12

(56) References Cited

U.S. PATENT DOCUMENTS

| | | | |
|---|---|---|---|
| 6,163,575 A | 12/2000 | Nieweglowski et al. | |
| 6,178,265 B1 | 1/2001 | Haghighi et al. | |
| 6,289,049 B1 | 9/2001 | Kim et al. | |
| 2002/0063706 A1 | 5/2002 | Prakash et al. | |

FOREIGN PATENT DOCUMENTS

| | | |
|---|---|---|
| WO | WO 00/64167 | 10/2000 |
| WO | WO 00/77735 | 12/2000 |

OTHER PUBLICATIONS

Prakash, Adityo, et al., "Motion Matching Method", U.S. Appl. No. 09/912,743, filed Jul. 23, 2001.
Ohm, Jens–Rainer "Motion–Compensated 3–D Subband And Coding With Multiresolution Representation Of Motion Parameters", paper # ICIP–80 pp. 1–5; Berlin, Germany.

*Primary Examiner*—Young Lee
(74) *Attorney, Agent, or Firm*—Okamoto & Benedicto LLP

(57) ABSTRACT

In a method and apparatus for predicting and coding motion vectors in a video compression scheme, an ordered list of segments for a reference frame is used to create a hierarchy of segments with a plurality of levels. Motion vectors for segments in the top level are entropy coded, and these vectors are used to predict vectors for segments at the next level. Residual vectors are entropy coded to correct these predictions, and the process of prediction from above and coding residuals continues recursively down through the hierarchy of segment levels. Information about the previous motion of segments may be exploited in the prediction process. In a complementary method and apparatus for decoding motion vectors, the same segment hierarchy is used to predict motion vectors by the same method used during encoding, and these predicted vectors are added to residual motion vectors to reconstruct the actual motion vectors.

28 Claims, 14 Drawing Sheets

Prediction of a Motion Vector

Segmented Reference Frame 100

Segment Position in New Frame 102

Segmented Frame

Result of Ordered Parent Node Selection

Connectivity of Parent Nodes

Result of Ordered Grandparent Node Selection

Grandparent Nodes

Prediction of a Motion Vector

HIERARCHICAL SEGMENT-BASED MOTION VECTOR ENCODING AND DECODING

CROSS-REFERENCES TO RELATED APPLICATIONS

This invention is related to co-pending U.S. patent application Ser. No. 09/550,705 to Adityo Prakash et al, titled "Method and Apparatus for Efficient Video Processing," filed Apr. 17, 200, attorney docket no. 020554-000200US, hereinafter 'Prakash I', the disclosure of which is incorporated herein by reference for all purposes.

This invention is also related to co-pending U.S. patent application Ser. No. 09/591,438 to Adityo Prakash et al, titled "Method and Apparatus for Digital Image Segmentation," filed Jun. 9, 2000, attorney docket no. 020554-000510US, hereinafter 'Prakash II', the disclosure of which is incorporated herein by reference for all purposes.

This invention is also related to co-pending U.S. patent application Ser. No. 09/912,743 to Adityo Prakash et al, titled "Motion Matching Method," filed Jul. 23, 2001, attorney docket no. 020554-000600US, hereinafter 'Prakash III', the disclosure of which is incorporated herein by reference for all purposes.

This invention is also related to co-pending U.S. patent application Ser. No. 09/922,299 to Adityo Prakash et al, titled "Method of Determining Relative Z-Ordering in an Image and Method of Using Same," filed Aug. 3, 2001, attorney docket number 020554-000710US, hereinafter 'Prakash IV', the disclosure of which is incorporated herein by reference for all purposes.

REFERENCES CITED

U.S. Pat. No. 6,163,575

U.S. Pat. No. 6,178,265

U.S. Pat. No. 6,289,049

Ohm, Jens-Rainer, "Motion-compensated 3-D subband coding with multiresolution representation of motion parameters," *Proc. IEEE Int. Conf. Image Processing*, Vol. II, Austin, Tex., 1994, pp. 250–254.

BACKGROUND OF THE INVENTION

1. Field of the Invention

The present invention relates generally to the temporal compression of digital video data by motion compensation. More specifically, the present invention relates to the encoding and decoding of motion vectors used to predict a new video frame by translating constituent portions of a reference video frame.

2. Description of the Related Art

With the rapid growth of digital media in the marketplace, the need to develop more efficient and more accurate methods for compressing the attendant large data files continues to receive much attention. Digital video data in particular require extensive storage space and large bandwidth for remote transmissions. A video sequence is comprised of individual frames that are arrays of pixels with color values associated to each pixel. For example, each frame might be a 720 by 480 array of pixels with component values for each of three colors (red, green, blue) ranging between 0 and 255 at each pixel. Since 8 bits are required to express each color value, if this sequence is 30 minutes long and comprises an industry-standard 30 frames per second, the raw digital data for the sequence will take up 3×8×720×480×30×60×30= 447,897,600,000 bits or approximately 56 gigabytes, excluding the capacity needed for audio. Given the limited capacity of most portable storage media and the limited bandwidth of many transmission channels, such a video sequence requires significant compression in order to find widespread availability in the marketplace.

Existing video compression strategies seek to reduce the bits required by removing redundancies within the video data. Video data generally contains both spatial and temporal redundancies, where spatial redundancy is due to color similarities within a single frame and temporal redundancy is due to the persistence of some objects or other image features over time and thus across two or more frames. A variety of methods for eliminating spatial redundancies have been introduced, including the techniques established by the JPEG standards body. Existing methods for reducing temporal redundancy involve encoding some subset of a sequence of frames as reference frames and attempting to describe interspersed frames as variations of one or more reference frame. Such methods considerably reduce the amount of information required for the non-reference frames and thus compress the video data beyond what is achievable by simply removing spatial redundancies.

While many of the same objects appear in neighboring frames of a video sequence, the positions of some of these objects may change due to either camera movement or activity within the scene. As a result, an effective means for matching objects between frames must take motion into account. This strategy is commonly referred to as motion compensation. Many existing technologies for temporal compression, including the MPEG-1, MPEG-2, and MPEG-4 standards, compensate for motion by breaking a frame into a grid of square blocks (generally 16×16 pixels or 8×8 pixels) and searching for square blocks in a reference frame that provide the best match for each of these blocks. Other proposed techniques break a frame into a plurality of other constituent parts, or segments, and conduct a similar matching process between a new frame and a reference frame. Since the matching block or segment in the reference frame will often not occupy the same relative position as the block or segment in the new frame due to motion, a displacement vector is used to record the amount of offset in the horizontal and vertical directions. A prediction for the new frame image can be made using only data for the reference frame and a displacement vector, or motion vector, for each block or segment. Since the new frame is unlikely to be perfectly reconstructed by this prediction, a residue or difference between actual data and the prediction must also be recorded. But compression is achieved since encoding both the motion vectors for each block and the residue requires fewer bits than encoding the raw data for the new frame directly.

A variety of techniques have been proposed for subdividing a frame into constituent blocks or segments and for determining motion vectors corresponding to these blocks or segments for the purpose of predicting a new frame using one or more reference frames. See Prakash I, Prakash II, and Prakash III for a more complete discussion of segmentation and motion matching of segments. Once a subdivision into blocks or segments has been carried out and motion vectors providing the most accurate prediction have been determined, an efficient method for encoding the motion vectors must be applied in order to realize the potential gains of this compression technique. While directly coding each motion vector for each block or segment individually may save bits over coding a new frame without temporal compression, many more bits may be conserved by further exploiting correlations among the motions of the plurality of blocks or segments. For instance, if neighboring blocks or segments move in a similar fashion, then there is no need to treat their motion vectors completely independently, and in fact bits may be saved by coding these vectors in a dependent way.

A standard adaptation of the MPEG block-matching technique for generating motion vectors is to predict motion vectors based on known motions of neighboring blocks and to encode an error correction vector. For instance, in a typical encoder/decoder compression system, it is desirable for the encoder to transmit as few bits as possible to the decoder while providing it with sufficient information to reconstruct a close approximation of the original image. Proceeding through the grid of blocks in raster-scan order, the decoder can predict a motion vector for a current block based on the previously coded vector for the neighboring block to the left of the current block. The encoder can perform the same prediction, compute the difference between the actual motion vector and this predicted motion vector, and encode and send the difference only to the decoder. If the neighboring blocks have similar motion vectors, this difference vector is likely to be close to zero and will thus on average consume fewer bits than the actual motion vector for the current block.

Variations on the above strategy for compressing motion vectors for blocks by predicting from neighbors have been proposed. For example, if the coding proceeds through blocks in raster-scan order, then a given block will typically border one block to the left and a plurality of blocks above whose motion vectors have already been coded. The vectors of this plurality of bordering blocks might be averaged to predict a motion vector for the current block. Alternatively, the closest matching vector among these neighboring blocks may be used as a prediction. These predictive techniques have also been used within an MPEG-based macroblock/subblock motion compensation strategy, as seen for instance in U.S. Pat. No. 6,289,049 to Hyun Mun Kim et al. In this strategy, motion matching is carried out first for each 16×16 macroblock in a frame-wide grid, then the resulting vectors are used to narrow the search range for each of four 8×8 blocks comprising a macroblock. Predictions for the 8×8 blocks may then be made with respect to other previously coded 8×8 blocks either within the same macroblock or in adjacent macroblocks.

Some other methods for conserving bits in the coding of motion vectors appear in the related art. U.S. Pat. No. 6,178,265 to Siamack Haghighi discloses a strategy comprised of histogramming all of the motion vectors for a given frame, using the histogram to select a subset of dominant motion vectors that represent clusters of actual motion vectors, and mapping actual motion vectors to the closest dominant motion vector before encoding them. In "Motion-compensated 3-D subband coding with multiresolution representation of motion parameters," *Proc. IEEE Int. Conf Image Processing*, Vol. II, Austin, Tex., 1994, pp. 250–254, Jens-Rainer Ohm discusses a multiresolution technique for representing motion vectors. In this paper, after motion vectors have been estimated hierarchically using a control grid structure, they are coded using a Laplacian pyramid structure. U.S. Pat. No. 6,163,575 to Jacek Nieweglowski et al discloses a method for coding motion information in a segment-based motion compensation scheme. This approach employs a linear motion vector field model, which provides several coefficients describing the motion of each segment rather than single motion vectors. Segments are merged and coefficients are dropped whenever possible to conserve bits in coding the motion information.

SUMMARY OF THE INVENTION

The present invention provides a new method and apparatus for the encoding and decoding of motion vectors in a segmentation-based video compression process. In such a process, a new frame is reconstructed using arbitrarily-shaped constituent segments from a reference frame and motion vectors indicating how each segment should be displaced to best fit into the new frame. The segmentation for the reference frame and the best-fitting motion vectors are assumed as inputs for the encoding process. Neighboring segments will in many cases be parts of larger objects or parts of associated objects and will thus have similar motion vectors. The present invention provides a novel way of encoding and decoding motion vectors that saves bits by exploiting the correlations between the motions of adjacent segments.

In one embodiment of the invention, segments in the reference frame are ordered and then decomposed into a hierarchy with several levels by both an encoder and a decoder. A higher level in the hierarchy is comprised of a set of segments that are not adjacent at the lower level but for which every segment at the lower level is adjacent to at least one of the segments in the higher level set. When a new level is created, its constituent segments are defined as adjacent if they shared a common adjacent segment in the previous lower level. This decomposition results in a top level of segments and one or more lower levels that are comprised of segments that are neighbors of segments appearing in higher levels. This hierarchy is used to predict motion vectors so that only small residual terms need to be encoded. First, the encoder encodes the actual motion vectors for the top level. Then, the encoder uses these top-level motion vectors to predict vectors for neighboring segments at the next level. The encoder uses actual motion vectors for the second-highest level to predict motion vectors for the next level, and the process continues until motion vectors have been predicted for the bottom level of the hierarchy. The encoder may perform more than one type of prediction and then select the one that produces the most accurate results for the whole frame. The encoder then encodes an indication of its choice of prediction technique and it accordingly encodes residual vectors for every segment in the hierarchy.

The decoder decodes the motion vectors for the top level and it selects the best prediction technique according to the encoder's instructions. The decoder then predicts motion vectors with the same method used by the encoder, proceeding downward through the hierarchy. After each vector is predicted, the decoder decodes the corresponding residual vector and adds it to its prediction to reconstruct the actual motion vector. When this process is complete, the decoder has reconstructed the actual motion vector for every segment in the hierarchy.

BRIEF DESCRIPTION OF THE DRAWINGS

A further understanding of the nature and the advantages of the invention disclosed herein may be realized by reference to the remaining portions of the specifications and the attached drawings.

To aid in understanding, identical reference numerals have been used wherever possible to designate identical elements in the figures.

DETAILED DESCRIPTION OF THE SPECIFIC EMBODIMENTS

1 Introduction

Figure 1:
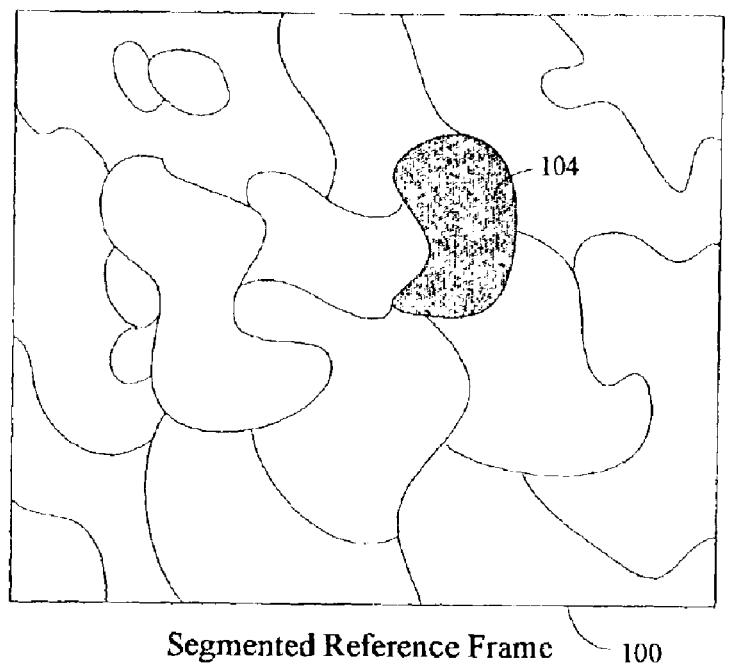
FIG. 1 illustrates the segmentation of a reference frame and the motion vector associated with one segment in the next frame.
Figure 1:
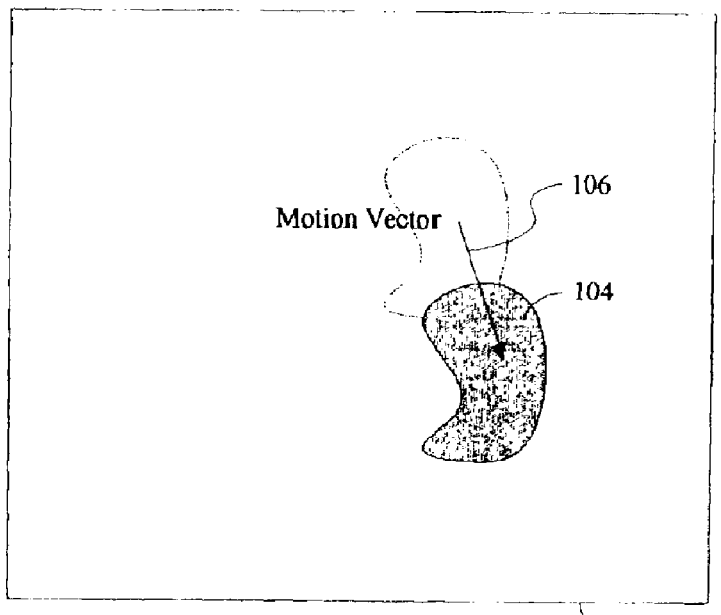

The present invention is designed to efficiently encode and decode the motion vectors in a segmentation-based video compression scheme. It has been recognized in the prior art that correlations between motion vectors of adjacent image portions may be leveraged to reduce the information needed to transmit frame-wide motion information. For example, in the case where motion vectors derive from an MPEG-based block matching motion compensation algorithm, a decoder can be trained to predict the vector for a given block based at least one of its neighbors so that an encoder transmits a small error term rather than the potentially large coefficients for the actual motion vector. Such strategies for block-based motion compensation can effectively reduce the bit requirement, but they suffer from the problem that block-based motion matching is extremely limited in the accuracy of the images it predicts. Since most objects in a typical video sequence are irregular and not comprised of blocks, they can at best be crudely reconstructed by moving blocks about. Furthermore, portions of different objects with very different motions may fall within the same square block in a grid, resulting in unavoidable error at the motion matching stage. As a result of these limitations, even with frugal coding of motion vectors, compression schemes involving block-based motion matching will require a significant bit expenditure to clear up error due to inaccurate motion matching.

Segmentation-based compression schemes provide a promising alternative to the block-matching approach. Segments are formed to match the constituent objects and object parts comprising a video scene. Since objects are identified more accurately, their predicted motions are potentially much more accurate. As a result, segmentation-based compression schemes can produce more faithful predictions based on reference frames, so the overall bit demand is potentially lower. In order to achieve these potential gains, a segment-based scheme must succeed at accurately and efficiently matching segments between frames. Thus, a segment-based scheme should both accurately determine motion vectors and encode those vectors using as few bits as possible. The related application Prakash III addresses the former demand. The present disclosure pertains to the latter goal of coding motion vectors within a segmentation-based compression scheme.

The present invention provides a novel technique for hierarchically using information about neighboring segments to predict motion vectors. Prior art techniques involving hierarchical or multiscale representations of motion vector data, as in the paper by Jens-Rainer Ohm cited in the Description of the Related Art above, use regular lattice-based multiband decompositions. Such techniques cannot be applied to segmentation-based motion vectors because the underlying structure of the segmentation is unrestricted and thus potentially very irregular. For instance, segments may vary widely in size, in the number of adjacent segments, and in the degree of adjacency with these neighbors (e.g. the length of their common boundaries). Thus, new heuristics are required to create a hierarchy of segments. The present invention provides a method for creating a hierarchy that effectively preserves information about the adjacency of segments, and the invention further provides novel instructions for exploiting the hierarchical structure to predict motion vectors and thus to conserve bits. In particular, an encoder and a decoder perform the same predictions using the hierarchical structure so that only small residual vectors must be encoded and transmitted in order to reconstruct all motion information.

The following paragraphs should further illustrate the teachings of the present invention by detailing the features of a preferred embodiment. One with ordinary skill in the art can readily conceive of various other means of reducing this invention to practice.

2 Detailed Description of the Drawings 2.1 Encoding and Decoding Motion Vectors

The preferred embodiment of the present invention applies to a segmented reference frame and a new frame that is to be approximated using the segments from the reference frame and their respective motion vectors. It is assumed that the process of segmentation and the selection of optimal motion vectors for each segment have been carried out and that the segments and the actual motion vectors are available to an encoder. Note that not every segment in the reference frame must have a motion vector. If a segment doesn't match any area in the new frame, then it may be excluded from the motion-matching process. The segmentation of the reference frame is also assumed to be available to a decoder. It is further assumed that any merging of adjacent segments with similar motion vectors into new larger segments has already been performed and is reflected in the current segmentation. The encoder compresses and transmits information about motion vectors to the decoder so that the decoder can construct a prediction for a new frame using the segments of the reference frame it has in memory.

FIG. 1 shows a stylized segmentation 100 of a reference frame. The segment 104 has a motion vector 106, which expresses the distance and the direction in which segment 104 should be displaced to best match the image data for the new frame 102. This drawing does not represent actual video data but is rather provided for illustrative reasons.

The preferred embodiment implements a series of steps in order to encode the motion information for segments in the reference frame. These steps are summarized in a flow chart in FIG. 2a. Box 200 represents data introduced to the encoder, including the segmentation of the reference frame, the best-fitting motion vectors for each segment, and previous motion vectors for each segment. In step 202, the encoder creates a hierarchy of segments in the reference frame consisting of a plurality of levels by a process discussed below. In step 204, the encoder entropy encodes the motion vectors for the top level of the hierarchy created in step 202. In step 206, the encoder proceeds to the next lower level of the hierarchy and predicts motion vectors for the segments at that level using one or more techniques. These techniques will be discussed further below. In step 208, the encoder determines whether any lower levels of the hierarchy remain. If the answer is yes, then the encoder returns to step 206. If the answer is no, then in step 210 the encoder compares the predictions made by the one or more prediction techniques in step 206 and selects the technique that results in the most accurate frame-wide predictions. The encoder then encodes an indicator of the preferred prediction technique to instruct the decoder in how to predict motion vectors. In step 212, the encoder computes residual vectors expressing the difference between actual motion vectors and predicted motion vectors (predicted by the chosen technique) and entropy codes these residual vectors for all remaining segments. Finally, box 216 represents the output of the encoder, including entropy-coded top-level vectors, a prediction indicator, entropy-coded lower-level residual vectors, and layering information for overlapping segments.

The preferred embodiment also implements a series of steps in order to decode the motion information for segments in the reference frame. These steps are summarized in a flow chart in FIG. 2b. Box 220 represents the data introduced to the decoder, including the segmentation of the reference frame, previous motion vectors, the prediction indicator, the entropy-coded top-level motion vectors, and entropy-coded lower-level residual vectors. In step 222, the decoder creates a hierarchy of segments in the reference frame consisting of a plurality of levels by the same method the encoder used in step 202. In step 224, the decoder decodes the motion vectors for the top level of the hierarchy of segments and decodes the prediction indicator to determine the technique it will use to predict motion vectors. In step 226, the decoder proceeds to the next lower level and predicts motion vectors using the indicated technique. After a prediction for a given segment, the decoder decodes the residual vector for that segment and adds it to the predicted vector to reconstruct the actual motion vector for that segment. In step 228, the decoder determines whether any lower levels of the hierarchy remain to be decoded. If the answer is yes, then the decoder returns to step 226. If the answer is no, then box 232 represents the decoder's output, comprising the original segments of the reference frame and the actual motion vectors for these segments. Note that the decoder may further use this information and potentially other information such as z-ordering, to construct a prediction for the new frame and for any further purposes, but such ensuing steps are beyond the scope of the present invention.

Figure 3:
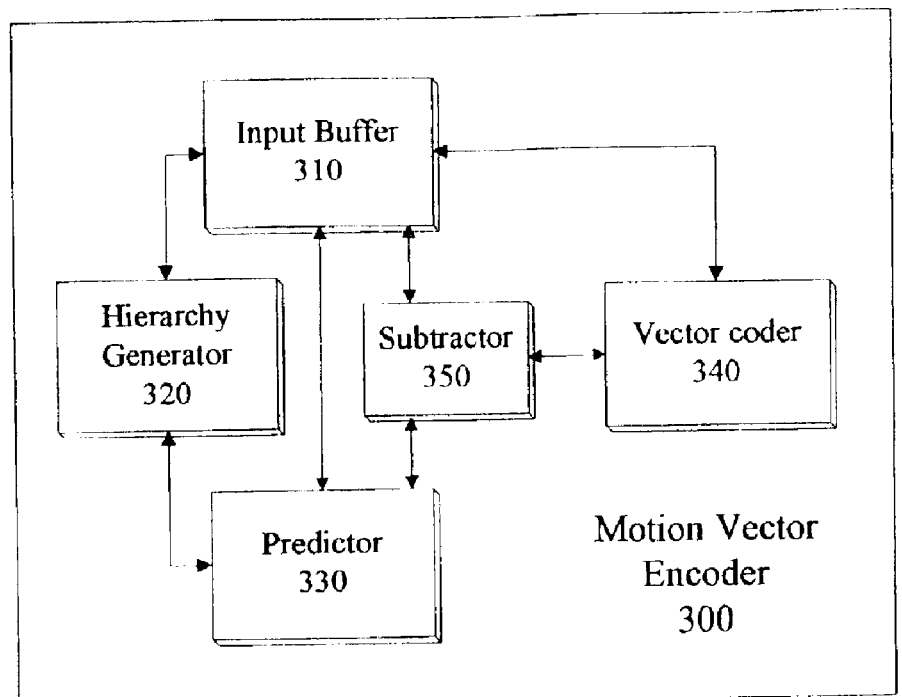
FIG. 3 is a schematic diagram of a motion vector encoder.

The preferred embodiment includes an apparatus for encoding motion vectors. FIG. 3 is a schematic diagram of a motion vector encoder 300. The motion vector encoder 300 includes an input buffer 310 that holds the results of a separate motion matching procedure, which include a segment list for the reference frame, an actual motion vector for each segment of the reference frame, and, whenever possible, a previous motion vector for each segment of the reference frame. A hierarchy generator 320 creates a hierarchy of segments in the reference frame according to the steps described with reference to FIG. 5 below. A predictor 330 calculates a prediction for each segment not in the top level of the hierarchy by at least one prediction technique, also explained in detail below. The predictor 330 uses the segment hierarchy created by the hierarchy generator 320 and the motion information recorded in input buffer 310 to make its predictions. A subtractor 350 subtracts predicted motion vectors (produced by the predictor 330) from the corresponding actual motion vectors recorded in the input buffer 310, resulting in residual motion vectors. A vector coder 340 encodes the actual motion vectors for the top hierarchy level (recorded in the input buffer 310) and encodes residual vectors produced by the subtractor 350 for each lower level. The output of motion vector coder 300 is an encoded sequence of motion vectors and residual vectors.

Figure 4:
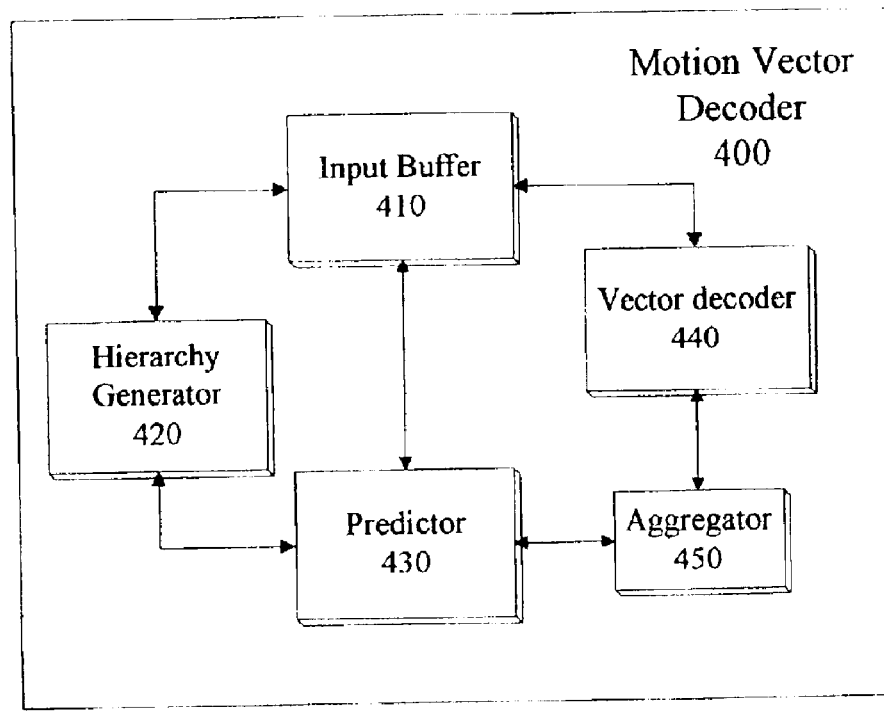
FIG. 4 is a schematic diagram of a motion vector decoder.

FIG. 4 is a schematic diagram of a motion vector decoder 400. The motion vector decoder 400 includes an input buffer 410 that holds the segmentation of a reference frame including a list of segments and, whenever possible, previous motion vectors for the segments, an indicator of prediction technique, and encoded motion vectors and residual motion vectors for the segments of the reference frame. A hierarchy generator 420 creates a hierarchy of segments in the reference frame according to the steps described with reference to FIG. 5 below. A vector decoder 440 decodes actual motion vectors for the top hierarchy level and decodes residual motion vectors for each lower level. The output of the vector decoder 440 is used to reconstruct actual motion vectors for segments of the reference frame. A predictor 430 sequentially predicts a motion vector for each segment not in the top level of the hierarchy using the prediction technique recorded in the input buffer and using reconstructed motion vector information for segments that came earlier in the sequence. After each prediction, an aggregator 450 adds the current prediction to its corresponding residual vector decoded by the vector decoder 440 to reconstruct the actual motion vector for the current segment. The predictor 430 may then use this reconstruction motion vector for subsequent predictions. The output of motion vector decoder 400 is a list of reconstructed actual motion vectors for the segments of the reference frame.

2.2 Creation of Segment Hierarchy

Figure 5:
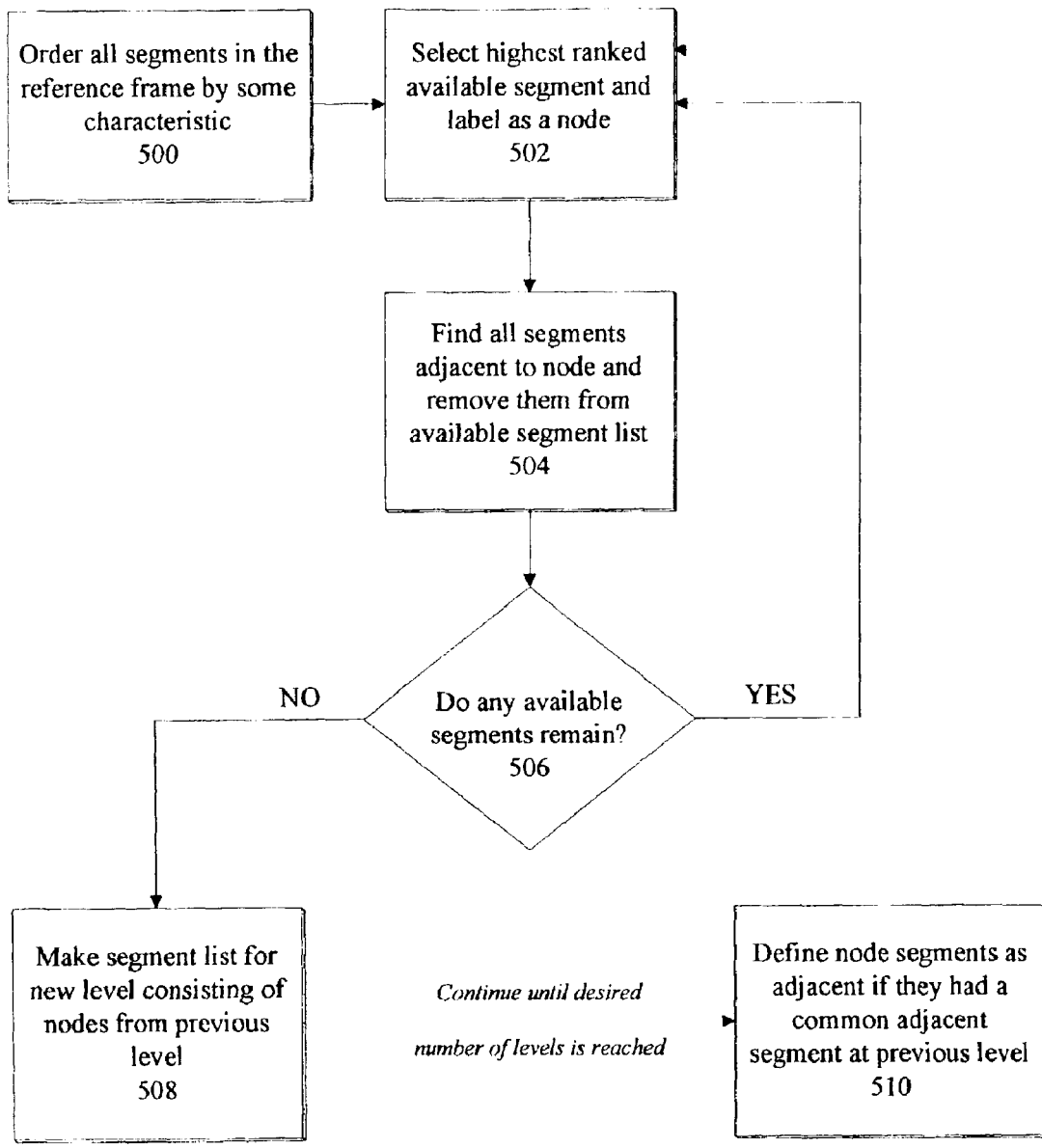
FIG. 5 is a flow chart describing the creation of a segment hierarchy.

FIG. 5 is a flow chart listing the steps involving in the creation of the segment hierarchy, as mentioned in steps 202 and 222 above and carried out by hierarchy generators 320 and 420. The procedure ranks all segments and then in one or more stages it extracts subsets of segments so that every segment at the earlier level is connected to at least one segment in the selected subset. In applications to video compression, the encoder and the decoder will both carry out this procedure so that they will have an identical structure with which to predict motion vectors. In step 500, all segments in the reference frame are ordered according to some characteristic. For instance, in the preferred embodiment segments are ordered by size (in number of pixels) from largest to smallest. If two or more segments are the same size, they should be ordered in some other way, for instance by raster-scan order of the first pixel in each segment. In other embodiments, characteristics such as color, shape, or previous motion could be taken into account in the ordering of segments. Resulting from step 500 is an ordered list of segments from which constituents for a higher level of the hierarchy will be chosen. In step 502, the largest segment, which is the first segment in the list, is taken as a node, where a node is a member of the subset selected to form the next higher level of the hierarchy. In step 504, the node chosen in step 502 and all segments that are immediately adjacent to it are removed from the ordered list of segments. Step 506 determines whether any segments remain on the ordered list of segments that was composed in step 500 and updated in step 504. If the answer is yes, then the procedure returns to step 502 and selects as a node the first segment that remains on the updated ordered segment list. If the answer is no, then in step 508 all nodes that have been selected from this list are compiled (in order) to form a segment list for the next higher level in the hierarchy. In this case, the procedure will continue recursively to select higher and higher levels in the hierarchy until the desired number of levels is reached. Before continuing, nodes in the new segment list are defined as adjacent if they shared a common adjacent segment at the previous level in the hierarchy (step 510). In this way, at each level a new smaller list of segments is generated, including information about which of these segments are "adjacent" in the sense of the current level.

The preferred embodiment performs the above procedure to form two levels above the original reference frame. In order to distinguish between levels, the segments in the first level are called "parent" nodes, and the segments in the second, or uppermost, level, are called "grandparent" nodes. Segments in the reference frame that are not parent nodes or grandparent nodes are referred to as "child" segments of any adjacent parent nodes for simplicity of discussion.

Figure 6A:
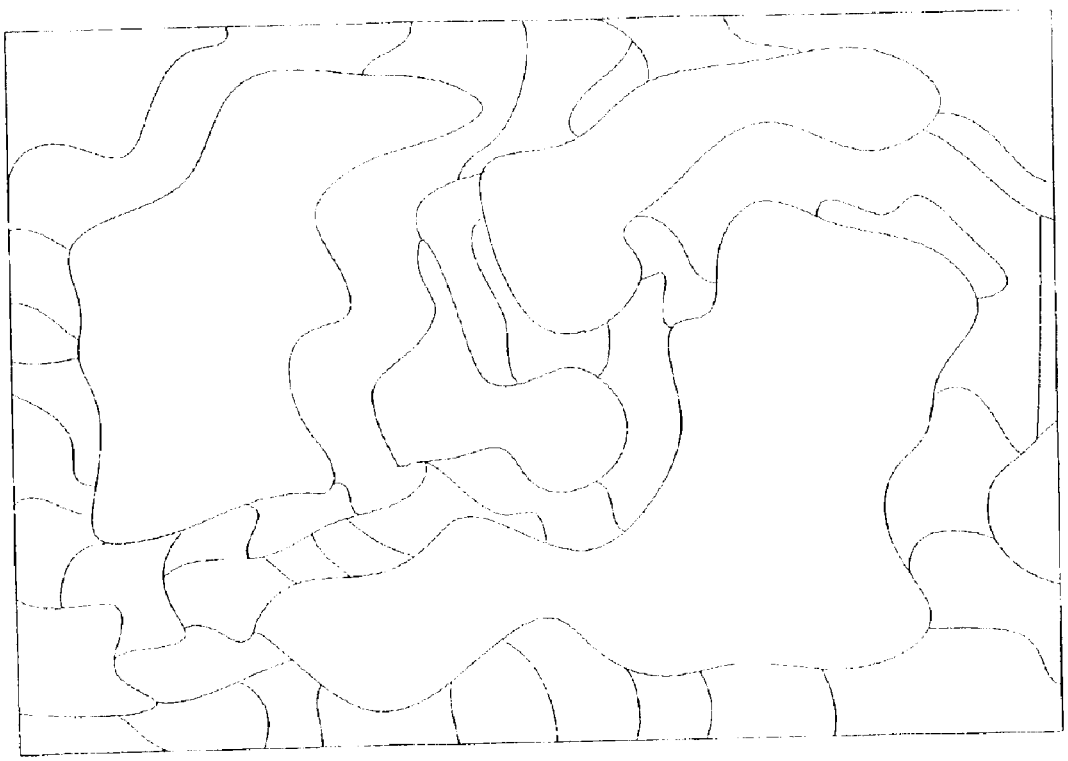
FIG. 6a illustrates a stylized segmentation of a reference frame.
Figure 6B:
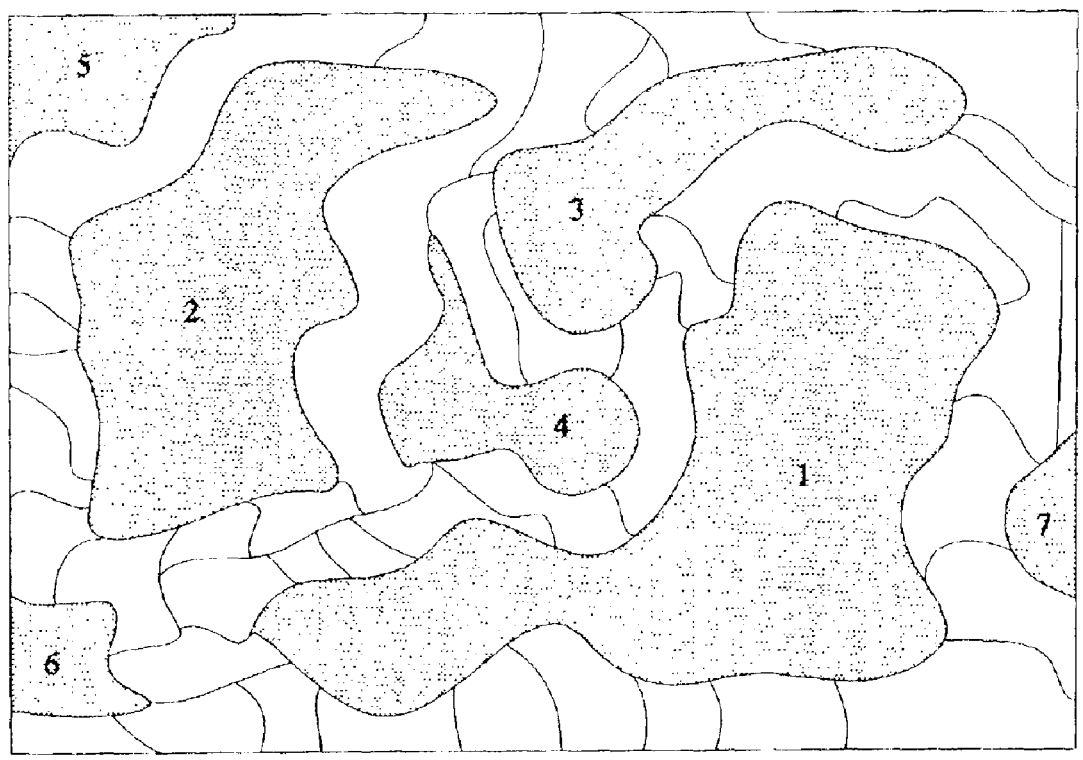
FIG. 6b illustrates the selection of ordered parent nodes from the reference frame.
Figure 6C:
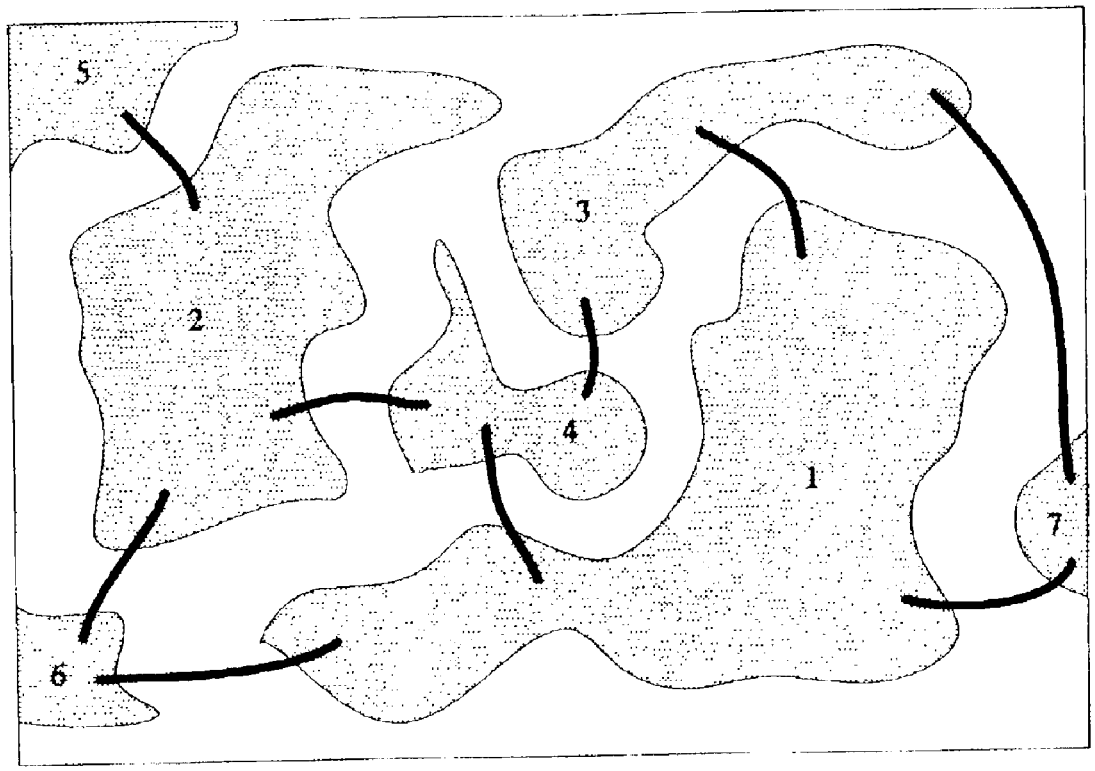
FIG. 6c illustrates the pairs of parent nodes that are connected by common adjacent segments.
Figure 6D:
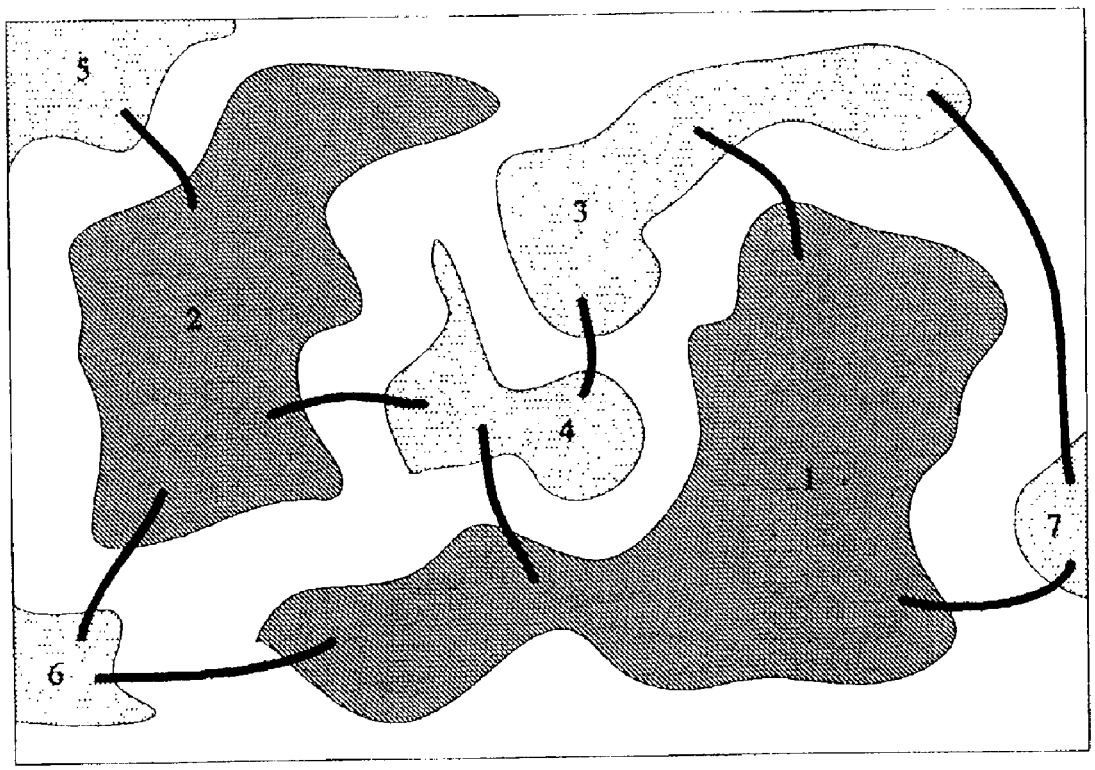
FIG. 6d illustrates the selection of ordered grandparent nodes from the connectivity graph of parent nodes.
Figure 6E:
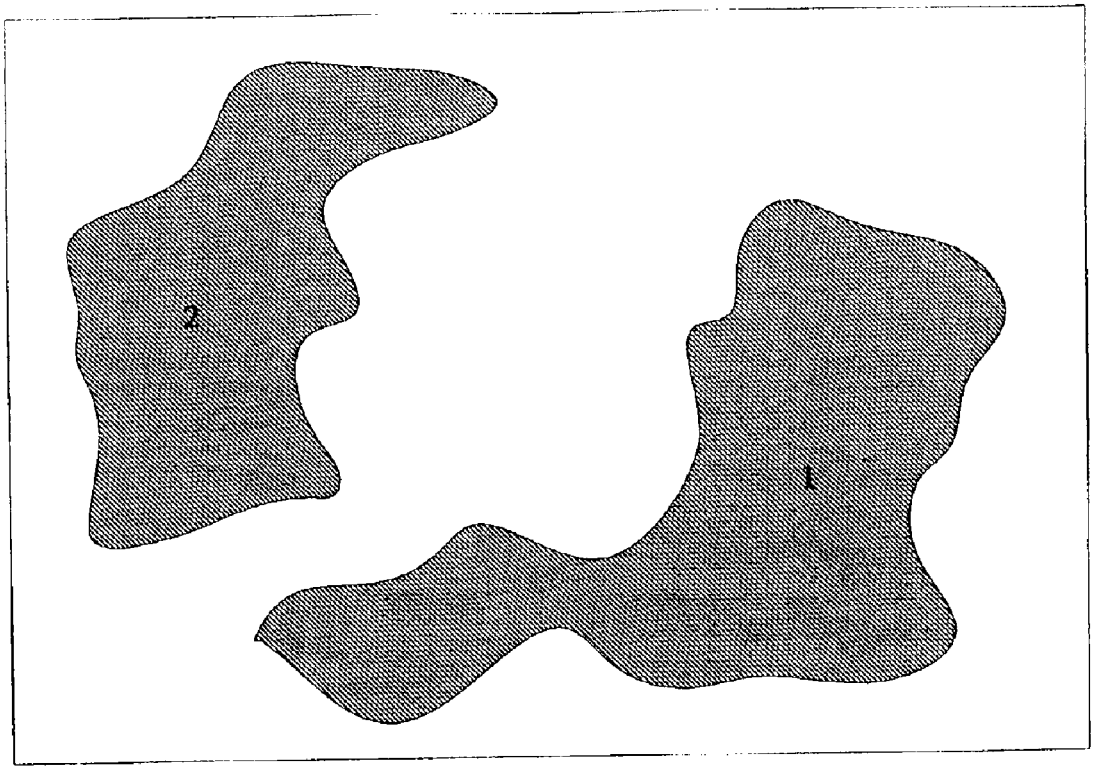
FIG. 6e illustrates the ordered grandparent nodes.

FIGS. 6a–e illustrate the creation of a segment hierarchy for a stylized example of a segmented reference frame. This frame is not drawn from actual video data but is rather intended to provide a simple illustration of the procedure. FIG. 6a shows the original reference frame segmentation. FIG. 6b shows the result of repeatedly applying steps 502 through 506 to create an ordered list of parent nodes. The parent nodes are numbered sequentially, so that the largest segment is node 1, the next largest segment that is not adjacent to node 1 is node 2, and so on. When node 7 is selected, every segment in the frame is adjacent to at least one selected parent node so the parent level is complete. FIG. 6c illustrates the result of step 510, in which parent nodes that share a common adjacent segment are connected and defined as "adjacent" for the purposes of the hierarchy. FIG. 6d shows the result of repeatedly applying steps 502 through 506 to the list of parent nodes to create an ordered list of grandparent nodes. Finally, FIG. 6e shows only the two grandparent nodes that form the top level of the hierarchy.

2.3 Predicting Motion Vectors

Figure 2A:
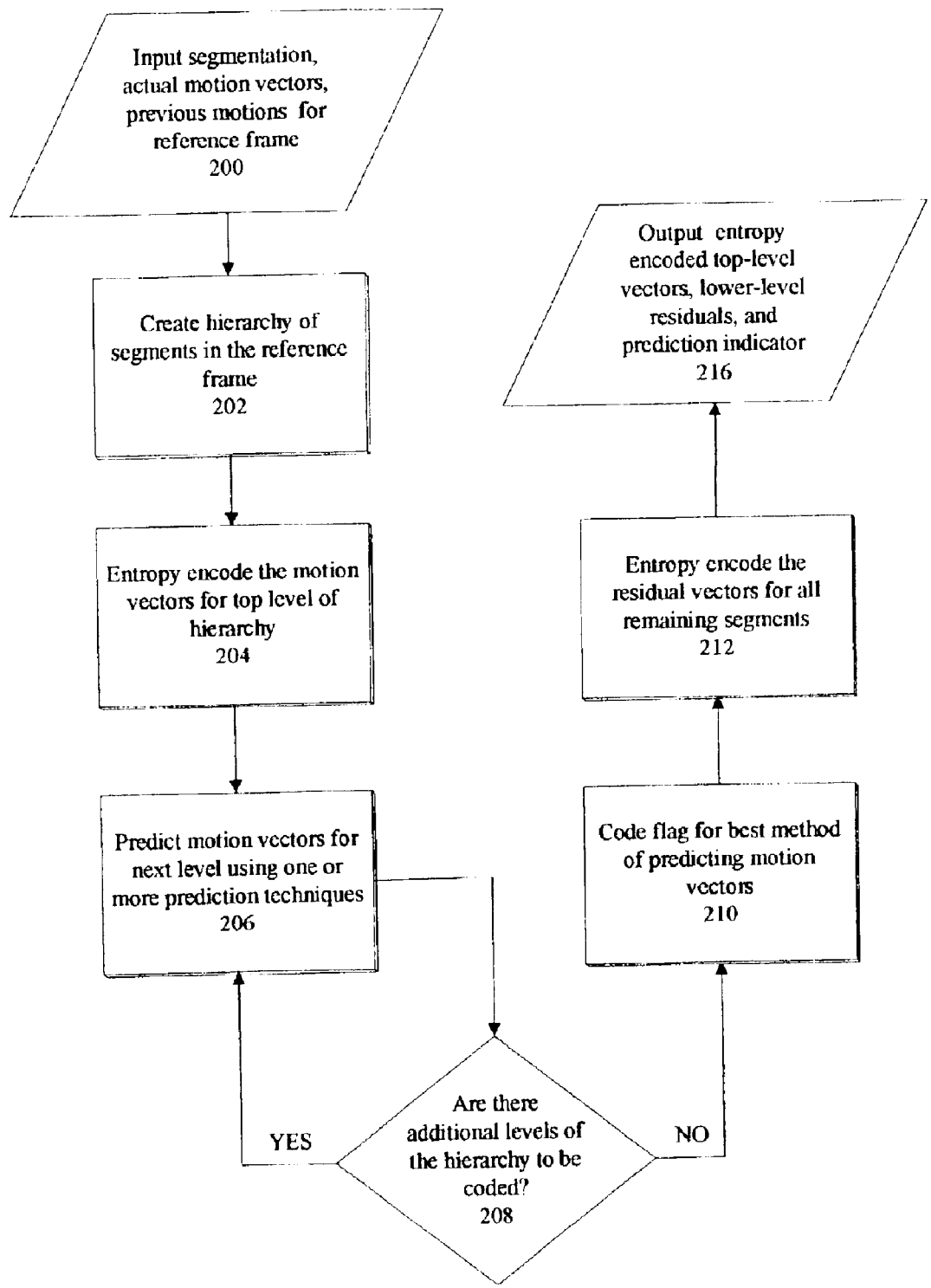
FIG. 2*a* is a flow chart describing the process by which motion vectors are encoded by an encoder.
Figure 7A:
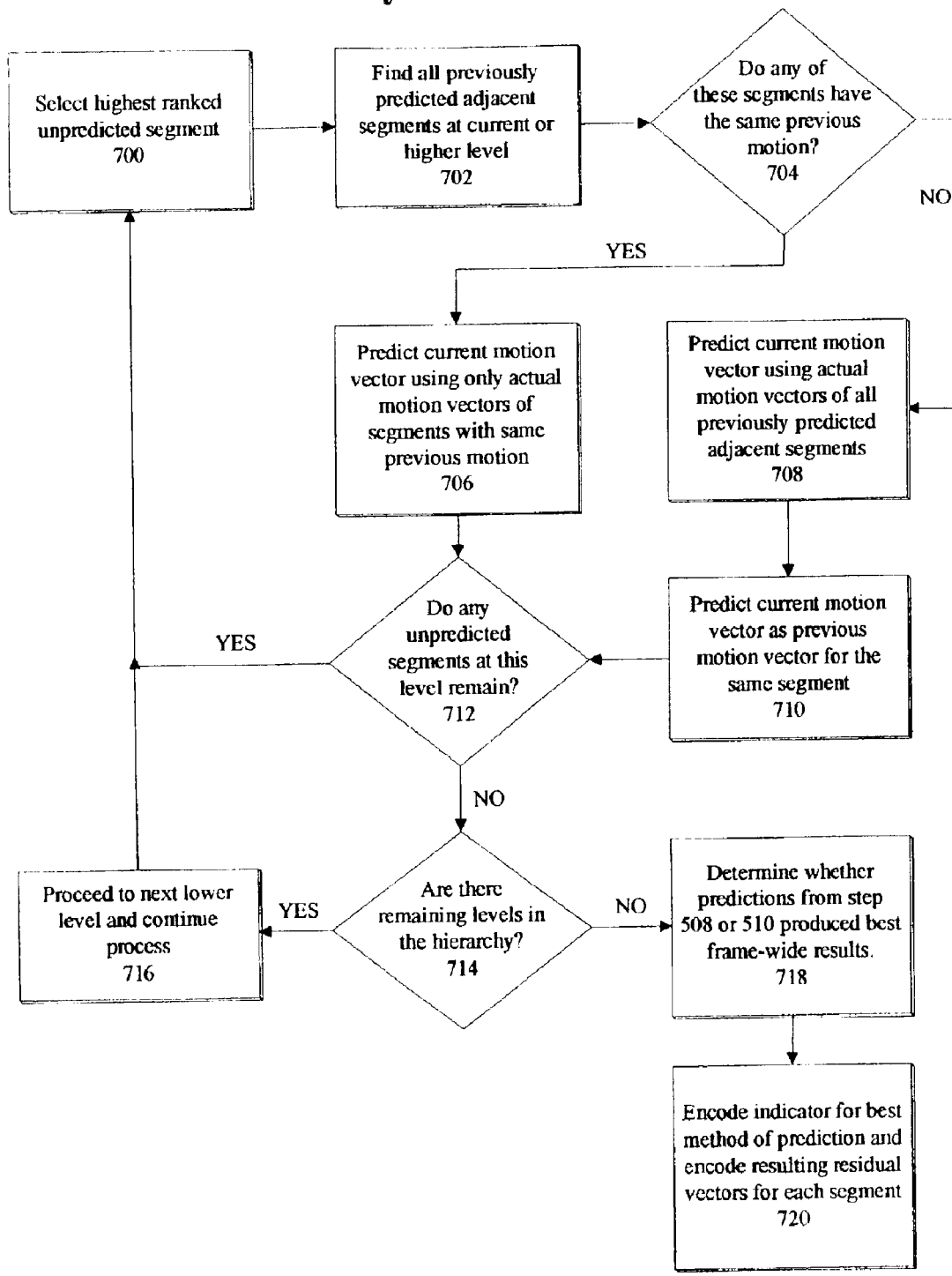
FIG. 7a is a flow chart describing the hierarchical prediction and coding of motion vectors by an encoder.

The flow chart in FIG. 7a describes the process by which the encoder predicts motion vectors for segments in the reference frame. In particular, FIG. 7a provides more detail for how steps 206 through 210 in FIG. 2a are carried out. Since prediction of motion vectors begins after the top-level motion vectors are encoded, this process will begin with the next highest level of the segment hierarchy. In step 700, the encoder selects the highest-ranked unpredicted segment at the current level. In step 702, the encoder finds all adjacent segments at the current or higher level whose motion vectors have already been encoded (if at the top level) or predicted (if at the current level). In step 704, the encoder checks previous motion vectors to determine whether any of these adjacent segments have the same previous motion as the current segment. If the answer is yes, then in step 706 the encoder predicts the current motion vector for the given segment as a weighted statistical average of the actual motion vectors of these adjacent segments with matching previous motion. If the answer is no, then in step 708 the encoder predicts the current motion vector for the given segment as a weighted statistical average of the actual motion vectors of all previously predicted or encoded adjacent segments. In step 710, the encoder makes an alternative prediction of the current motion vector for the given segment by taking the previous motion vector of this segment as a prediction. Note that steps 708 and 710 represent two prediction alternatives in the preferred embodiment, but in other embodiments a variety of different or additional prediction alternatives can be considered at this stage. After these predictions are performed, in step 712 the encoder determines whether any unpredicted segments remain at the current level. If the answer is yes, then the process returns to step 700 and motion vectors are similarly predicted for remaining segments. If the answer is no, then in step 714 the encoder determines whether any levels of the hierarchy remain to be predicted. If the answer is yes, then the encoder proceeds to the next lower level in step 716 and then continues the same process, returning to step 700. If the answer is no, then the encoder has predicted motion vectors for all relevant levels of the hierarchy. In this case, in step 718 the encoder compares the different prediction choices (in steps 708 and 710, and in additional steps in other embodiments) and selects the one that produces the best predictions for the whole frame. In step 720, the encoder encodes a prediction indicator to inform a decoder of the preferred method of prediction, and then if computes and entropy encodes residual vectors for all remaining segments based on this preferred prediction technique.

Figure 2B:
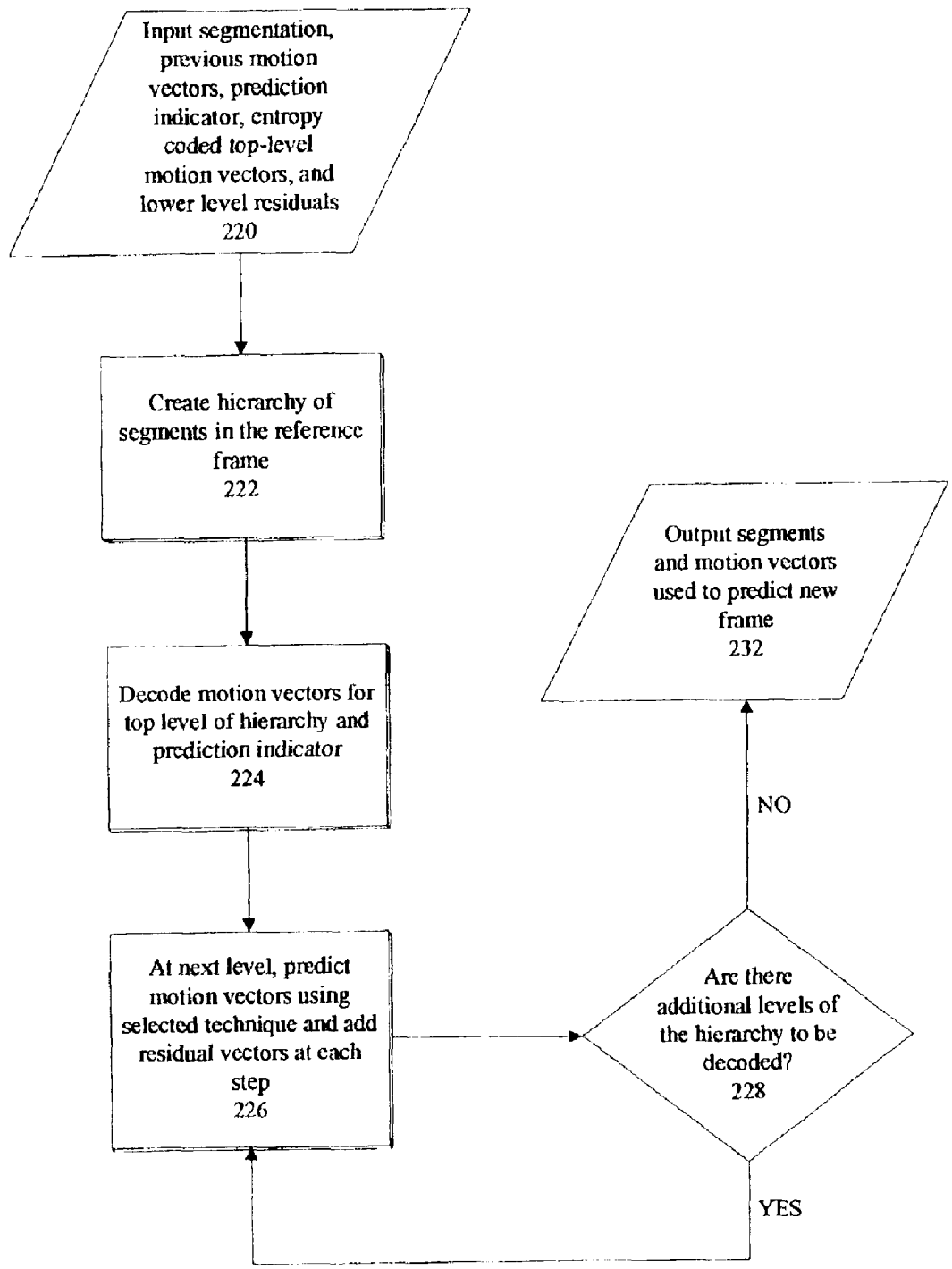
FIG. 2*b* is a flow chart describing the process by which motion vectors are decoded by a decoder.
Figure 7B:
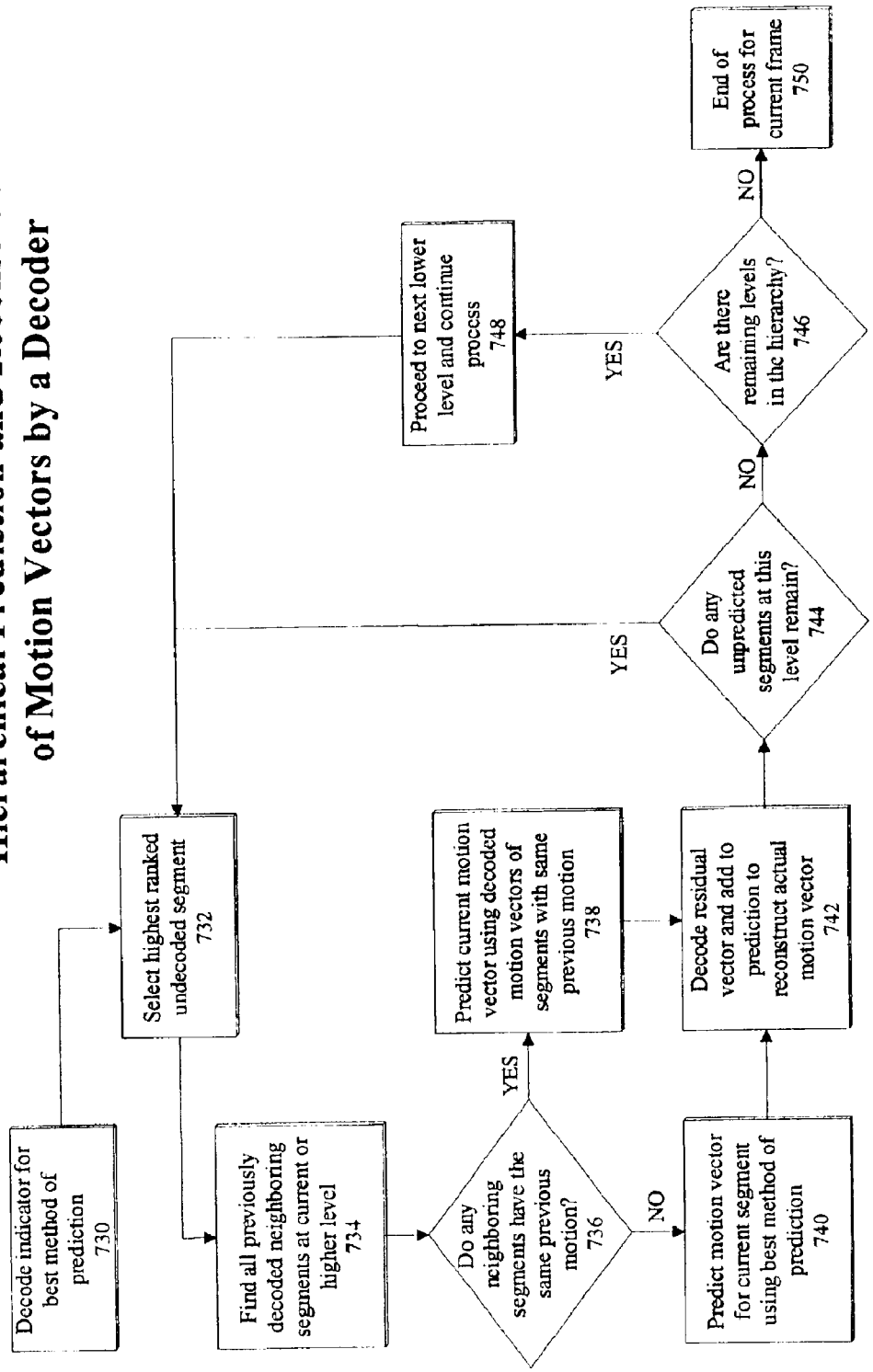
FIG. 7b is a flow chart describing the hierarchical prediction and reconstruction of motion vectors by a decoder.

The flow chart in FIG. 7b describes the process by which the decoder predicts and then reconstructs motion vectors for segments in the reference frame using information in the bit stream provided by the encoder. In particular, FIG. 7b provides more detail for how steps 226 through 228 in FIG. 2b are carried out. Since prediction of motion vectors begins after the top-level motion vectors are decoded, this process will begin with the next highest level of the segment hierarchy. In step 730, the decoder decodes the prediction indicator to determine the method of prediction is will use. In step 732, the decoder selects the highest-ranked undecoded segment at the current level. In step 734, the decoder finds all adjacent segments at the current or higher level whose motion vectors have already been decoded. In step 736, the decoder checks previous motion vectors to determine whether any of these adjacent segments have the same previous motion as the current segment. If the answer is yes, then in step 738 the decoder predicts the motion vector for the current segment using the decoded actual motion vectors of these adjacent segments with matching previous motion. If the answer is no, then in step 740 the decoder predicts the motion vector for the current segment using the method of prediction determined in step 730. After either prediction is performed, in step 742 the decoder decodes the corresponding residual vector and adds it to the predicted motion vector to reconstruct the actual motion vector for the current segment. Note that this reconstruction works because the encoder and the decoder are synchronized to use the same prediction. After step 742, the current segment is referred to as "decoded" for future purposes. Next, in step 744, the decoder determines whether any undecoded segments remain at the current level. If the answer is yes, then the process returns to step 732 and motion vectors for remaining segments are sequentially decoded. If the answer is no, then in step 746 the decoder determines whether any levels of the hierarchy remain to be decoded. If the answer is yes, then the decoder proceeds to the next lower level of the hierarchy in step 748 and then continues the decoding process at step 732. If the answer is no, then all motion vectors for the current frame have been decoded so this process ends for the current frame (step 750).

In FIGS. 7a and 7b, steps 704 and 736 determine whether neighboring segments have the same previous motion as a current segment. Adjacent segments that have the same previous motion are likely to have similar future motion since they are likely to represent connected objects or parts of the same object. Furthermore, previous motion for a given segment may provide a good prediction for future motion since in many video sequences the motion of objects is continuous across many frames. For instance, if a football is thrown in a sports scene, it may continue moving in more or less the same direction for many frames. In sequential coding of video frames, a frame that was at one stage predicted using motion vectors might at a later stage be used as a reference frame for predicting a subsequent frame. In this case, information about the motion vectors used to construct this reference frame could be beneficial in predicting the motions of various segments in the next frame, since segments that move the same way in one frame are likely to continue doing so. Steps 706 and 710 in FIG. 7a and step 738 (and possibly step 740) in FIG. 7b make use of this previous motion information when it is available. In the preferred embodiment, when the segmentation information for a reference frame is introduced to the encoder and decoder for use in this process, whenever possible it includes a previous motion quantity for each segment. This quantity might be an average of the previous motion vectors of the pixels in the segment, for example, since the current segment itself may not match perfectly a segment from a previous reference frame. The previous motion quantity can be left void if previous motion for a segment cannot be determined. For example, if a reference frame was intra-coded (i.e. was not predicted using any another frame), no previous motion information will exist. However, when the previous motion quantity is present, steps 706 and 738 preferentially predict a motion vector for a segment based on already-computed motion vectors for neighboring segments with matching previous motion. Furthermore, step 710 (and possibly step 740) will in this case use the previous motion quantity for the given segment itself as a predictor of its current motion vector.

Figure 8:
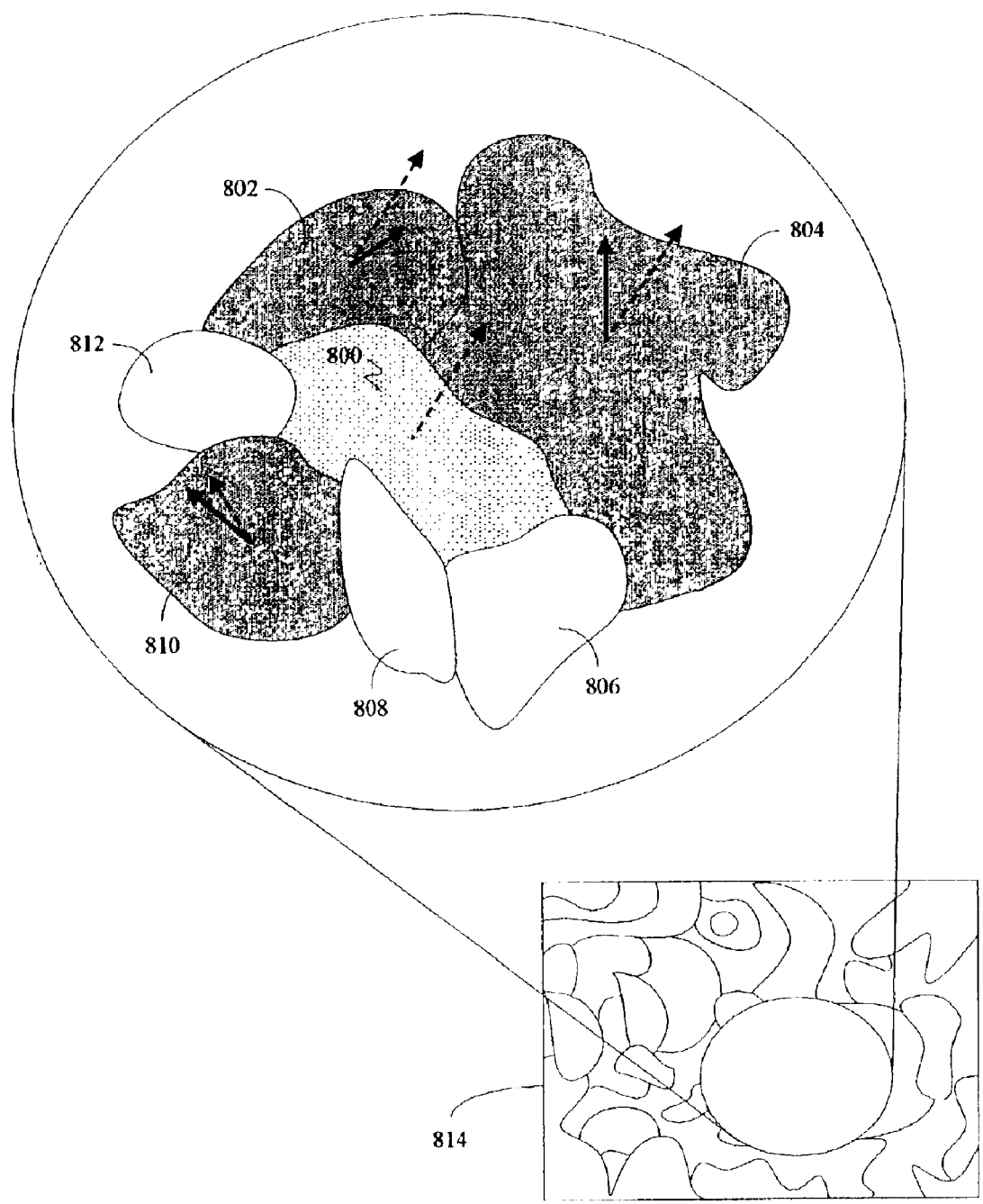
FIG. 8 illustrates the process of predicting the motion vector for a segment based on its neighbors.

FIG. 8 illustrates the process of predicting the motion vector for a segment based on its neighbors in the preferred embodiment, as described in FIG. 7a. A highlighted segment 800 is assumed to be the highest-ranked remaining segment with an unpredicted motion vector, so it is next to be predicted. The surrounding segments 802, 804, 806, 808, 810, and 812 are all adjacent to segment 800. Only adjacent segments are shown, so this figure represents only a portion of a segmented reference frame 814. Segments 802, 804, and 810, which are shaded, have motion vectors that have already been predicted, while segments 806, 808, and 812 have not yet had their motion vectors predicted. In the process described above, segments 802, 804, and 810 are examined to determine a prediction for segment 800. The broken-line arrows attached to each of the segments 800, 802, 804, and 810 represent the previous motion vectors for these segments. The dark-line arrows attached to segments 802, 804, and 810 represent their actual motion vectors for the next frame. Since the previous motion vectors for segments 802 and 804 match the previous motion vector for segment 800, the actual motion vectors for segments 802 and 804 are used to predict a motion vector for segment 800 (according to step 706 in FIG. 7a above). The difference between the actual motion vector for segment 800 and the predicted motion vector for segment 800 is encoded as a residual vector, and then the process can proceed to the next segment on the list. Note that if none of the previous motion vectors for segments 802, 804, and 810 had matched segment 800's previous motion vector, then the prediction for segment 800 would occur differently, as determined by steps 708 and 710 in FIG. 7a. In this sense, the example of FIG. 8 illustrates only one of several situations that may arise in predicting motion vectors.

2.4 Reconstructing New Frame

The motion vectors as coded above may not unambiguously tell the decoder how to construct a prediction for the new frame. Unlike square-grid block matching algorithms, the process of moving irregular segments from a previous frame to new locations in a new frame does not ensure that the new frame will be covered with non-overlapping pieces. The best-fitting motion vectors could in fact result in overlap when segments are placed in the new frame, so these ambiguities should be resolved. The related co-pending application Prakash IV describes a method for ordering such overlapping segments. Moving irregular segments around to predict a new frame may also result in some gaps or uncovered regions in the new frame. The concept is similar to what would happen if pieces of a jigsaw puzzle were shifted around to represent motion within a picture. In this example, the pieces would be unlikely to fit together perfectly to form a new image, so some overlaps and some gaps may exist. In a complete encoder/decoder video compression scheme, other methods beyond the scope of the current invention may be used both to predict how to fill these gaps and to correct the full predicted frame with a residual bit stream. After these steps are carried out and the decoder has reconstructed the new frame fully, this new frame may be independently segmented so that it can then be used as a reference frame for one or more subsequent frames.

2.5 Encoder/Decoder System

Figure 9:
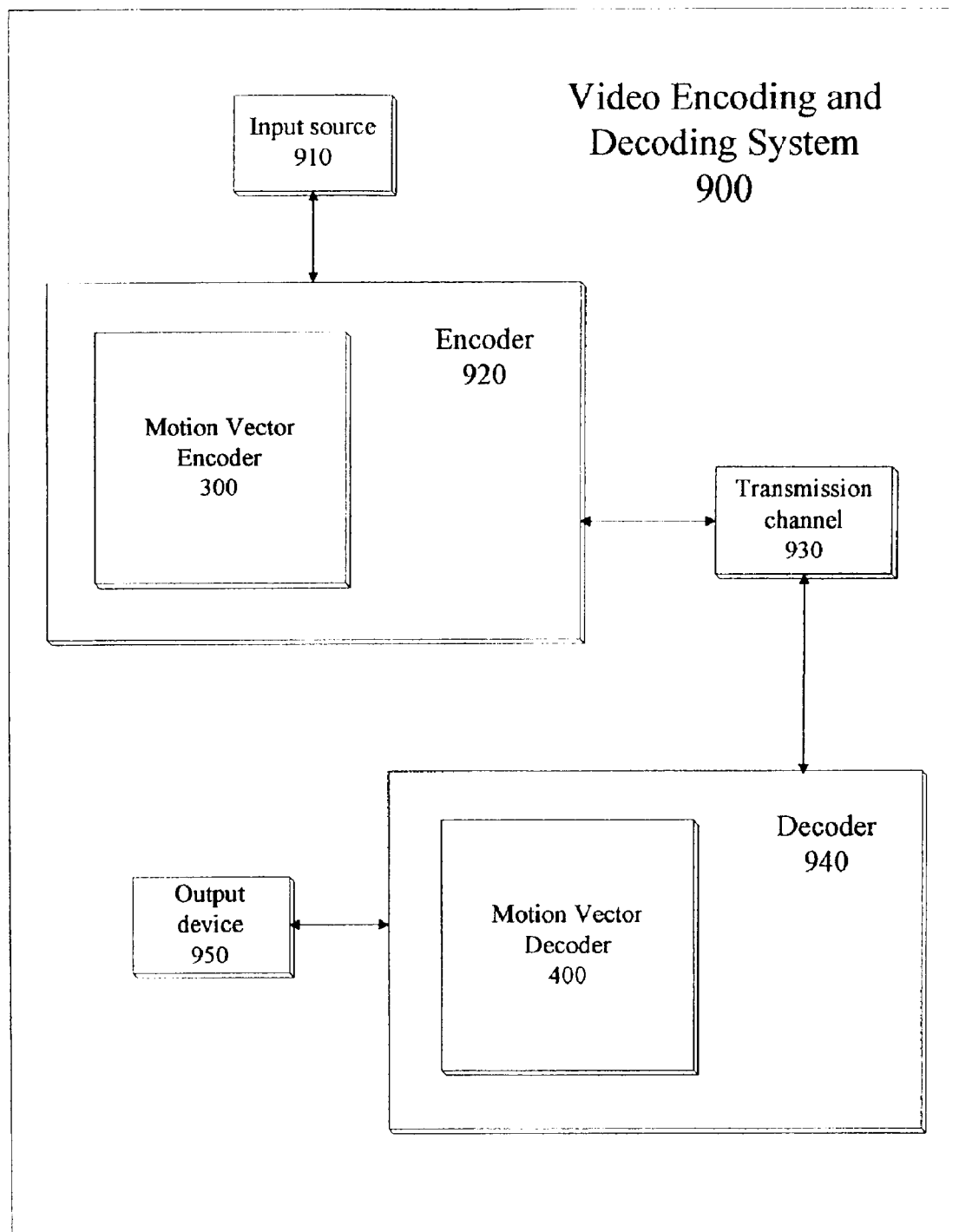
FIG. 9 illustrates a system for encoding and decoding video data.

The motion vector encoder and motion vector decoder of the present invention are suited to carry out important functions within a video compression scheme. FIG. 9 illustrates a video encoding and decoding system 900 comprising an input source 910, an encoder 920, a transmission channel 930, a decoder 940, and an output device 950. The motion vector encoder 300 described with reference to FIG. 3 is included within the encoder 920. The motion vector decoder 400 described with reference to FIG. 4 is included within the decoder 940. By functioning in concert with the other features of a segmentation-based encoding and decoding process, the motion vector encoder 300 and decoder 400 allow significant bit savings and thus result in a higher rate of compression. For more information about the other features of the encoding and decoding system 900, refer to Prakash I, Prakash II, and Prakash III.

3 Conclusion, Ramifications, and Scope

The present invention provides an efficient method to encode motion vectors within a segmentation-based video compression scheme. By structuring the segments of a reference frame hierarchically, this method allows most motion vectors to be predicted so that only small residual vectors must be encoded. These smaller residual vectors collectively have less entropy and can thus be encoded using fewer bits than would be required to encode all motion vectors directly. The present invention also provides for an apparatus to carry out this novel motion coding process. In particular, a system including an encoder and a decoder may transmit and receive motion vectors for each of a plurality of segments in a reference frame according to the process disclosed herein.

Both the structure of the hierarchy of segments and the means for using this hierarchy to predict motion vectors using known vectors of neighbors represent innovations in the field. Applications of this invention will form a foundational step in the realization of the impressive gains in compression efficiency that a segmentation-based compression scheme makes possible.

The above description is illustrative and not restrictive. The scope of the invention should, therefore, be determined not with reference to the above description, but instead should be determined with reference to the appended claims along with their full scope of equivalents.

What is claimed is:

1. A method for predicting motion vectors, wherein said motion vectors express displacements of irregular image segments between at least one reference frame and a new image frame, said method comprising:

accessing a segment list for at least one reference frame;

accessing motion vectors for a plurality of segments from the list;

generating a hierarchy of segments consisting of at least two levels, wherein higher levels represent sparser subsets of segments at lower levels; and using said hierarchy of segments to predict motion vectors for segments in lower levels using motion information for nearby segments in at least one higher level.

2. The method of claim 1, wherein more than one prediction technique is used to predict motion vectors for segments in lower levels, further comprising:

selecting the prediction technique that results in the most accurate prediction of motion vectors.

3. The method of claim 1, wherein the hierarchy of segments is generated by:

assigning all segments to a first level;

assigning a pair-wise nonadjacent subset of segments from a previous level to a next level, such that each segment in the previous level is adjacent to at least one segment in the higher level, wherein adjacency is redefined at each level so that two segments are adjacent at a given level if they share a common adjacent neighbor at the previous level; and iterating the previous step until a maximum number of levels has been generated.

4. The method of claim 3, wherein the step of assigning segments to a next level further comprises:

ranking all segments initially according to segment size;

selecting the largest available segment in the ranking as a representative segment for the next level and removing this segment from the list;

selecting the next largest segment that is not adjacent to any previously selected segments as the next representative segment for the next level; and iterating the previous step until the segment list is exhausted and defining the set of selected segments as the next level of the hierarchy.

5. The method of claim 1, further comprising:

accessing previous motion vectors expressing how said segments moved during earlier time increments; and utilizing said previous motion vectors to identify segments most likely to provide an accurate prediction when predicting motion vectors for lower levels.

6. The method of claim 5, wherein the process of using the hierarchy of segments to predict motion vectors for segments in lower levels comprises:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such adjacent segment was identified; and predicting the motion vector of the selected segment as a statistical average of the current motion vectors for all adjacent segments whose motion vectors have already been predicted if no such segments have previous motion vectors similar to that of the selected segment.

7. The method of claim 5, wherein the process of using the hierarchy of segments to predict motion vectors for segments in lower levels comprises:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such segment was identified; and predicting the motion vector of the selected segment as the previous motion vector for the selected segment if no such adjacent segments have previous motion vectors that are similar to that of the selected segment.

8. A method for encoding motion vectors during video compression, wherein said motion vectors express displacements of irregular image segments between at least one reference frame and a new image frame, said method comprising:

carrying out the method of claim 1;

encoding the actual motion vectors for segments in the top level of the hierarchy;

subtracting predicted motion vectors from the corresponding actual motion vectors for segments in lower levels of the hierarchy to create residual motion vectors; and encoding said residual motion vectors.

9. The method of claim 8, further comprises:

accessing previous motion vectors expressing how said segments moved during earlier time increments; and utilizing said previous motion vectors to identify segments most likely to provide an accurate prediction when predicting motion vectors for lower levels, comprising:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such adjacent segment was identified; and predicting the motion vector of the selected segment as a statistical average of the current motion vectors for all adjacent segments whose motion vectors have already been predicted if no such segments have previous motion vectors similar to that of the selected segment.

10. The method of claim 8, further comprises:

accessing previous motion vectors expressing how said segments moved during earlier time increments; and utilizing said previous motion vectors to identify segments most likely to provide an accurate prediction when predicting motion vectors for lower levels, comprising:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such segment was identified; and predicting the motion vector of the selected segment as the previous motion vector for the selected segment if no such adjacent segments have previous motion vectors that are similar to that of the selected segment.

11. The method of claim 8, wherein top-level actual motion vectors and residual vectors for remaining levels are encoded using arithmetic coding.

12. The method of claim 8, wherein the list of segments and actual motion vectors includes indicators for one or more segments that have no motion vectors and should be excluded from the process.

13. The method of claim 8, wherein the generation of a hierarchy of segments comprises:

ranking all segments initially according to segment size;

assigning all segments to a first level;

assigning a pair-wise nonadjacent subset of segments from the previous level to a next level by:

selecting the largest available segment in the ranking as a representative segment for the next level and removing this segment from the list;

selecting the next largest segment that is not adjacent to any previously selected segments as the next representative segment for the next level; and iterating the previous step until the segment list is exhausted and defining the set of selected segments as the next level of the hierarchy; and iterating the assignment of segments to a next level, wherein adjacency is redefined at each level so that two segments are adjacent at a given level if they share a common adjacent neighbor at the previous level, until a designated maximum number of levels has been generated.

14. A method for decoding motion vectors during video compression, wherein said motion vectors express displacements of irregular image segments between at least one reference frame and a new image frame, said method comprising:

accessing encoded motion vectors and encoded residual motion vectors for a plurality of segments;

decoding said encoded motion vectors and said encoded residual motion vectors for lower levels;

carrying out the method of claim 1, wherein decoded top-level motion vectors and previously-reconstructed lower-level motion vectors are used to perform each prediction; and adding the corresponding decoded residual motion vector to the predicted motion vector at each step to reconstruct an actual motion vector.

15. The method of claim 14, further comprises:

accessing previous motion vectors expressing how at least one segment moved during an earlier time increment; and utilizing said previous motion vectors to identify segments most likely to provide an accurate prediction when predicting motion vectors for lower levels, wherein the prediction process comprises:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such adjacent segment was identified; and predicting the motion vector of the selected segment as a statistical average of the current motion vectors for all adjacent segments whose motion vectors have already been predicted if no such segments have previous motion vectors similar to that of the selected segment.

16. The method of claim 14, further comprises:

accessing previous motion vectors expressing how at least one segment moved during an earlier time increment; and utilizing said previous motion vectors to identify segments most likely to provide an accurate prediction when predicting motion vectors for lower levels, wherein the prediction process comprises:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such segment was identified; and predicting the motion vector of the selected segment as the previous motion vector for the selected segment if no such adjacent segments have previous motion vectors that are similar to that of the selected segment.

17. The method of claim 14, wherein the generation of a hierarchy of segments comprises:

ranking all segments initially according to segment size;

assigning all segments to a first level;

assigning a pair-wise nonadjacent subset of segments from the previous level to a next level by:

selecting the largest available segment in the ranking as a representative segment for the next level and removing this segment from the list;

selecting the next largest segment that is not adjacent to any previously selected segments as the next representative segment for the next level; and iterating the previous step until the segment list is exhausted and defining the set of selected segments as the next level of the hierarchy; and iterating the assignment of segments to a next level, wherein adjacency is redefined at each level so that two segments are adjacent at a given level if they share a common adjacent neighbor at the previous level, until a designated maximum number of levels has been generated.

18. An apparatus for encoding motion vectors during video compression, wherein said motion vectors express displacements of irregular image segments between at least one reference frame and a new image frame, said apparatus comprising:

an input buffer for storing a segment list for at least one reference frame and motion vectors for a plurality of segments from the list;

a hierarchy generator for generating a hierarchy of segments consisting of at least two levels, wherein higher levels represent sparser subsets of segments at lower levels;

a predictor for using said hierarchy of segments to predict motion vectors for segments in lower levels using motion information for nearby segments in at least one higher level;

a subtractor for subtracting predicted motion vectors from corresponding actual motion vectors for segments in lower levels, creating residual motion vectors; and a vector coder for encoding actual motion vectors for the top level and residual motion vectors for lower levels of the hierarchy.

19. The apparatus of claim 18, wherein the vector coder arithmetically encodes top-level actual motion vectors and residual vectors for remaining levels.

20. The apparatus of claim 18, wherein the input buffer can store an indicator for one or more segments that have no motion vectors and should be excluded from the process.

21. The apparatus of claim 18, wherein the input buffer also stores previous motion vectors for at least one segment and wherein the predictor uses the segment hierarchy to predict motion vectors by:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such adjacent segment was identified; and predicting the motion vector of the selected segment as a statistical average of the current motion vectors for all adjacent segments whose motion vectors have already been predicted if no such segments have previous motion vectors similar to that of the selected segment.

22. The apparatus of claim 18, wherein the input buffer also stores previous motion vectors for at least one segment and wherein the predictor uses the segment hierarchy to predict motion vectors by:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such segment was identified; and predicting the motion vector of the selected segment as the previous motion vector for the selected segment if no such adjacent segments have previous motion vectors that are similar to that of the selected segment.

23. The apparatus of claim 18, wherein the hierarchy generator generates a hierarchy of segments by:

ranking all segments initially according to segment size;

assigning all segments to a first level;

assigning a pair-wise nonadjacent subset of segments from the previous level to a next level by:

selecting the largest available segment in the ranking as a representative segment for the next level and removing this segment from the list;

selecting the next largest segment that is not adjacent to any previously selected segments as the next representative segment for the next level; and iterating the previous step until the segment list is exhausted and defining the set of selected segments as the next level of the hierarchy; and iterating the assignment of segments to a next level, wherein adjacency is redefined at each level so that two segments are adjacent at a given level if they share a common adjacent neighbor at the previous level, until a designated maximum number of levels has been generated.

24. An apparatus for decoding motion vectors during video compression, wherein said motion vectors express displacements of irregular image segments between at least one reference frame and a new image frame, said apparatus comprising:

an input buffer for storing a segment list for at least one reference frame and encoded motion vectors and encoded residual motion vectors for a plurality of segments from the list;

a hierarchy generator for generating a hierarchy of segments consisting of at least two levels, wherein higher levels represent sparser subsets of segments at lower levels;

a vector decoder for decoding the encoded motion vectors and the encoded residual motion vectors stored in the input buffer;

a predictor for using said hierarchy of segments to predict motion vectors for segments in lower levels using decoded motion information for nearby segments in at least one higher level; and an aggregator for adding predicted motion vectors to corresponding decoded residual motion vectors to reconstruct actual motion vectors, which are accessible to the predictor for use in later predictions.

25. The apparatus of claim 24, wherein the input buffer also stores previous motion vectors for at least one segment and wherein the predictor uses the segment hierarchy to predict motion vectors by:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such adjacent segment was identified; and predicting the motion vector of the selected segment as a statistical average of the current motion vectors for all adjacent segments whose motion vectors have already been predicted if no such segments have previous motion vectors similar to that of the selected segment.

26. The apparatus of claim 24, wherein the input buffer also stores previous motion vectors for at least one segment and wherein the predictor uses the segment hierarchy to predict motion vectors by:

selecting a segment from the segment hierarchy;

identifying all segments in either the same level or any higher level of the hierarchy that are adjacent to the selected segment and whose motion vectors have already been predicted;

identifying which, if any, of the adjacent segments have previous motion vectors that are similar to that of the selected segment;

predicting the motion vector of the selected segment as a statistical average of the current motion vectors for all segments identified in the previous step if at least one such segment was identified; and predicting the motion vector of the selected segment as the previous motion vector for the selected segment if no such adjacent segments have previous motion vectors that are similar to that of the selected segment.

27. The apparatus of claim 24, wherein the hierarchy generator generates a hierarchy of segments by:

ranking all segments initially according to segment size;

assigning all segments to a first level;

assigning a pair-wise nonadjacent subset of segments from the previous level to a next level by:

selecting the largest available segment in the ranking as a representative segment for the next level and removing this segment from the list;

selecting the next largest segment that is not adjacent to any previously selected segments as the next representative segment for the next level; and iterating the previous step until the segment list is exhausted and defining the set of selected segments as the next level of the hierarchy; and iterating the assignment of segments to a next level, wherein adjacency is redefined at each level so that two segments are adjacent at a given level if they share a common adjacent neighbor at the previous level, until a designated maximum number of levels has been generated.

28. A system for encoding and decoding a compressed digital video sequence, said system including the motion vector encoding apparatus of claim 18 and the motion vector decoding apparatus of claim 24.

* * * * *